Dec. 29, 1931.  S. G. GASSAWAY  1,838,822
EMULSION TREATER
Filed Nov. 22, 1926
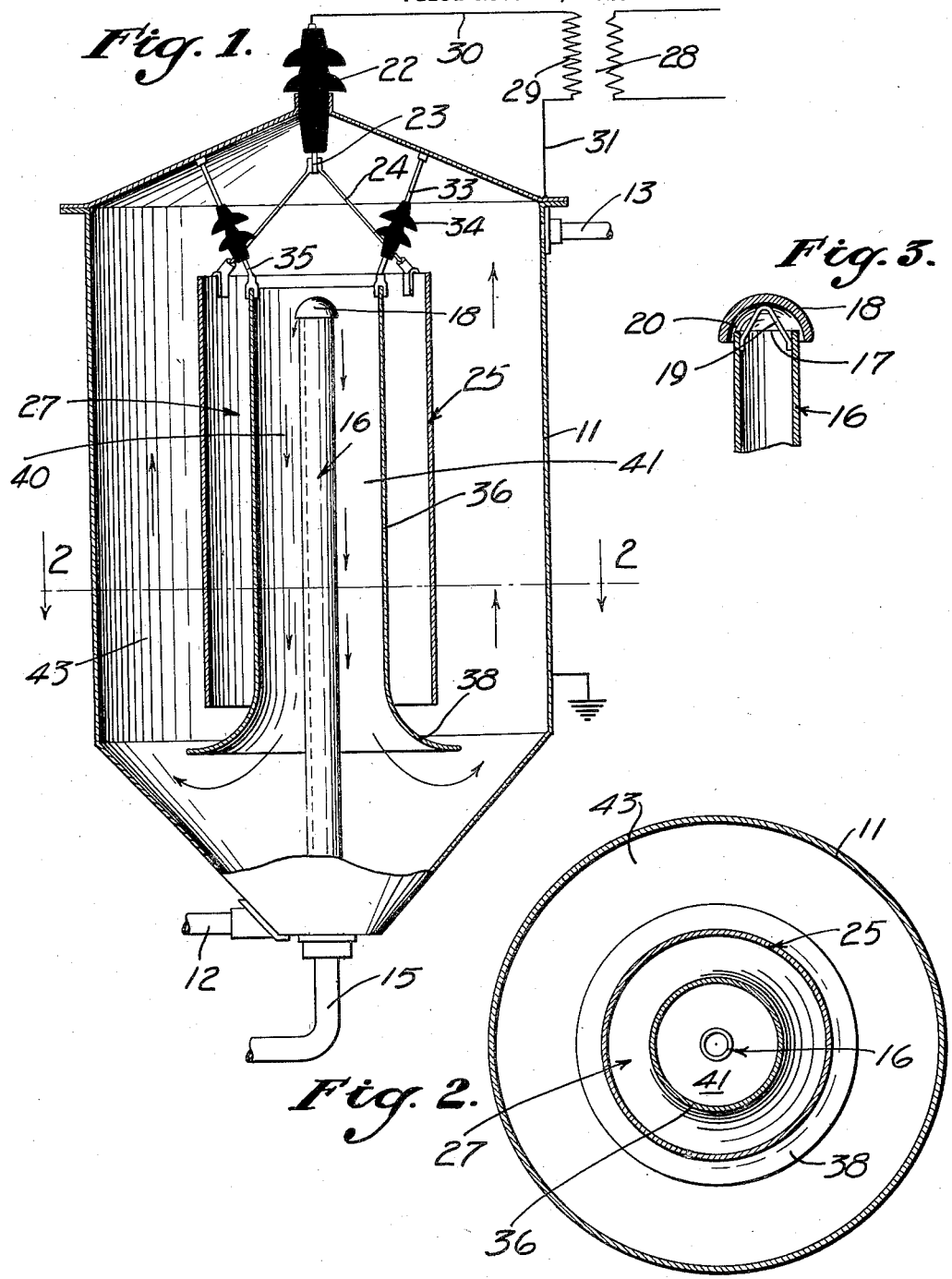
INVENTOR:
STEPHEN G. GASSAWAY.
BY Fad A. Lauie
ATTORNEY.

Patented Dec. 29, 1931

1,838,822

UNITED STATES PATENT OFFICE

STEPHEN G. GASSAWAY, OF LOS ANGELES, CALIFORNIA, ASSIGNOR TO PETROLEUM RECTIFYING COMPANY OF CALIFORNIA, OF LOS ANGELES, CALIFORNIA, A CORPORATION OF CALIFORNIA

EMULSION TREATER

Application filed November 22, 1926. Serial No. 149,956.

My invention relates to the electrical dehydration of petroleum emulsions. Petroleum as produced from the ground is often mixed with water, either due to the presence of water in the well or to accidental introduction of water therein due to defective casing or the like. In many cases the emulsion so produced consists of extremely minute particles or drops of water carried in the body of the oil, these drops being so small that they remain in suspension in the oil over long periods of time. It is important that this water be removed, preferably at the point of production of the oil, and for the purpose of so dehydrating the emulsion various types of electrical dehydrators have been devised. These dehydrators usually operate upon the principle of impressing a relatively high potential between electrodes immersed in the body of the emulsion. In the ordinary dehydration of petroleum emulsions, these electrodes may be approximately four inches apart and the potential difference therebetween may be in the neighborhood of 11,000 volts. It is apparently quite important to the success of electrical dehydration that conduction between the electrodes be reduced to a minimum. This conduction occurs whenever the amount of water in the electric field exceeds a certain value. What apparently happens is that the water particles more or less line up between the electrodes, forming chains of electrically conducting bodies which readily carry current between the electrodes. This conduction between the electrodes tends to lower the effective potential induced on the field and it is a rather common occurrence for dehydrators to become short-circuited or "bogged down" so that there is substantially no potential in the field due to the low resistance chains established the eacross. It is apparently necessary to the success of an electrical dehydrator that the internal electrical resistance be kept very high, which can conveniently be accomplished if one or the other of the electrodes is completely surrounded or enveloped in a body of dry oil, this oil having an extremely high resistance and serving to prevent short-circuiting of the electrodes. It is extremely difficult, however, where wet emulsion is introduced into the treater to uniformly distribute this emulsion in such a manner that it will not diffuse through or penetrate the envelope of dry oil, and it is an object of my invention to so construct a dehydrator that the wet emulsion will be directed therethrough in such a manner that the envelope of dry oil is not destroyed or impaired.

Further objects and advantages will be made evident hereinafter.

Referring to the drawings in which I illustrate a preferred form of the invention, Fig. 1 is a vertical section through a dehydrator embodying the features of the invention.

Fig. 2 is a cross section taken on the line 2—2 of Fig. 1.

Fig. 3 is an enlarged fragmentary section of the inlet means of the invention.

Referring in detail to the drawings, I provide a tank 11 having a water drain pipe 12 connected to the lower end thereof and an oil take-off pipe 13 connected near the upper end thereof. Extending concentrically and vertically into the tank 11 is an emulsion inlet pipe 15. A portion of this emulsion inlet pipe 15, as indicated at 16, provides the primary central grounded electrode of the invention.

Referring to Fig. 3, the upper end of the electrode 16 has a rounded annular face 17, and placed over the top thereof is a cup 18 which is supported by a suitable bracket 19. The cup is provided for the purpose of providing a passage 20 through which the emulsion must pass and which passage 20 directs the emulsion downward along the electrode 16.

An inlet bushing 22 is supported in the upper end of the tank 11. The inlet bushing 22 carries a rod 23 which extends therethrough and which has arms 24 attached to the lower ends thereof. The arms 24 support a secondary live electrode 25. The live electrode 25 surrounds the grounded electrode 16, being cylindrical as illustrated best in Fig. 2. A treating space 27 is provided between the two electrodes.

In Fig. 1 there is shown a transformer 28 having a secondary 29 which is connected to the rod 23 by means of a conductor 30 and to the tank 11 by a conductor 31. The live electrode 25 is therefore connected to one side of the secondary 29 of the transformer 28 and the grounded electrode 16 is connected to the other side of the secondary. When the transformer 28 is energized, an electric field is established in the treating space 27.

Attached to the top of the tank 11 are rods 33 which support insulators 34. Carried by the lower parts of the insulators 34 are arms 35 which support a baffle 36. The baffle 36 is supported in the treating space 27 and is cylindrical as illustrated best in Fig. 2. The lower end of the baffle 36 is provided with a bell-shaped portion 38 which flares out considerably. The baffle 36 as is evident from the drawings is insulated from the other parts of the dehydrator. The baffle 36 may be made from either conductive or non-conductive material.

The operation of the invention is substantially as follows.

Emulsion to be treated is delivered to the dehydrator by the emulsion inlet 15. The emulsion passes upward through the primary or grounded electrode 16 and issues from the upper end thereof through the annular space 20. This emulsion is directed downward by means of the cup 18, flowing through the treating space as indicated by arrows 40. The baffle 36 provides a path or passageway 41 through which the emulsion must pass. The emulsion is confined by the baffle 36 to the area of the treating space 27 immediately around the grounded electrode 16. It is therefore retained in the portion of the treating space where the field intensity is the greatest. The electric field is not interfered with by the baffle 36 because the baffle 36 is insulated by means of the insulators 34 from other parts of the apparatus.

During the passage through the treating space the water particles of the emulsion are coalesced by the action of the electric field into bodies of water which drop to the lower end of the tank 11, being removed therefrom through the water drain pipe 12. The lower end of the baffle 36 is flared so that dry oil may move outward and then pass upward through a space 43 provided between the live electrode 25 and the tank 11. It will be seen that there is also an electric field formed between the live electrode and the tank and the oil is therefore subjected to further treatment. In event that any water particles are carried by the upward moving oil, they will be coalesced and will drop to the bottom of the tank.

From the foregoing description it will be seen that the emulsion enters the treating space at a definite point, namely, near the upper end thereof, and passes from the treating space at a definite point, namely, at the lower end thereof. No agitation or turbulent action takes place between the dry oil outside the baffle and the wet oil inside the baffle, since these are separated by the baffle 36 which confines the emulsion to a definite path and prevents agitation. Were it not for the baffle 36 the emulsion would not be constrained to a definite passage but would diffuse in the treating space 27 so that no definite path would be maintained. If the emulsion were handled in any volume, turbulent action resulting from the unrestraint of the oil would greatly interfere with dehydration. By thus confining the emulsion to the space 41 short circuiting between the electrodes 16 and 25 will be eliminated inasmuch as no wet emulsion passes through the annular space between the baffle 36 and the secondary electrode 25, this space being filled with dry oil.

The general combination of an inner and an outer electrode with a nozzle means for directing the fluid to be treated along the central electrode are not per se a part of the present invention except as they cooperate with the baffle 36, these general features being shown and claimed in copending applications filed by Harmon F. Fisher, Serial Nos. 135,804 and 203,253, the present application being an improvement over the dehydrators therein shown in so far as the baffle 36 is concerned.

I claim as my invention:

1. In a dehydrator of the class described, the combination of: a primary electrode; a secondary electrode, there being a treating space between said electrodes; means for establishing a difference in potential between said electrodes in said treating space; means for delivering emulsion to said treating space; and an insulated baffle for guiding said emulsion through said treating space so that substantially all treatment of the emulsion takes place in the space between said baffle and one of the electrodes.

2. In a dehydrator of the class described, the combination of: primary and secondary electrodes defining a treating space; means for establishing a difference in potential between said electrodes; means for delivering to said treating space the fluid to be treated; and an insulated baffle in said treating space for guiding said fluid through said treating space along a certain path.

3. In a dehydrator, the combination of: central and surrounding electrodes defining a treating space therebetween; means for establishing a difference in potential between said electrodes; an insulated baffle concentric with said central electrode and dividing said treating space into two zones; and means for introducing the fluid to be treated into that portion of said treating space between said central electrode and said baffle.

4. In a dehydrator, the combination of: a central vertically disposed electrode; a surrounding vertically disposed electrode, there being a treating space therebetween; means for establishing a difference in potential between said electrodes; an insulated baffle extending into said treating space; and means for introducing the fluid to be treated into said treating space between one end of said baffle and said central electrode, the other end of said baffle flaring toward said surrounding electrode.

5. In combination: a tank adapted to contain a dielectric material; primary and secondary electrodes in said tank and defining a treating space therebetween; means for establishing a difference in potential between said electrodes; an insulated baffle extending into said treating space; and means for introducing into said treating space between said baffle and one of said electrodes a fluid to be treated having a lower dielectric strength than said dielectric material which lies between said baffle and the other of said electrodes.

6. In a dehydrator, the combination of: a primary electrode; a secondary electrode surrounding said primary electrode, there being a treating space between said electrodes; an insulated baffle extending at least partially through said treating space and dividing said treating space into two zones; and means for introducing the fluid to be treated into one of said zones.

7. In a dehydrator, the combination of: a tank containing a body of liquid dielectric material; a central vertically disposed electrode; a surrounding vertically disposed electrode, there being a treating space between said electrodes; means for establishing a difference in potential between said electrodes; an insulated baffle extending longitudinally in said treating space; and means for introducing in a downward direction and into the upper end of the space between said baffle and said central electrode a fluid to be treated having a lower dielectric strength than that portion of said dielectric material which is in the space between said baffle and said surrounding electrode.

8. A combination as defined in claim 6 in which said baffle is formed of a non-conducting material.

In testimony whereof, I have hereunto set my hand at Los Angeles, California, this 17th day of November, 1926.

STEPHEN G. GASSAWAY.